United States Patent
Kopra et al.

(10) Patent No.: US 7,752,539 B2
(45) Date of Patent: Jul. 6, 2010

(54) RECEIVING AND SENDING CONTENT ITEMS ASSOCIATED WITH A MULTIMEDIA FILE

(75) Inventors: Toni Kopra, Vantaa (FI); Mikko Mäkipää, Helsinki (FI)

(73) Assignee: Nokia Corporation, Espoo (FI)

( * ) Notice: Subject to any disclaimer, the term of this patent is extended or adjusted under 35 U.S.C. 154(b) by 755 days.

(21) Appl. No.: 10/974,187

(22) Filed: Oct. 27, 2004

(65) Prior Publication Data

US 2006/0090124 A1 Apr. 27, 2006

(51) Int. Cl.
G06F 17/00 (2006.01)
(52) U.S. Cl. .................. 715/232; 715/203; 715/204
(58) Field of Classification Search ............. 715/500.1, 715/512, 203, 204, 230, 232; 709/203
See application file for complete search history.

(56) References Cited

U.S. PATENT DOCUMENTS

| | | | | |
|---|---|---|---|---|
| 5,146,552 | A * | 9/1992 | Cassorla et al. | 715/512 |
| 6,449,653 | B2 * | 9/2002 | Klemets et al. | 709/231 |
| 6,519,050 | B1 * | 2/2003 | Eintracht et al. | 358/1.15 |
| 6,687,878 | B1 * | 2/2004 | Eintracht et al. | 715/201 |
| 2002/0107808 | A1 | 8/2002 | Dobbelaar | |
| 2003/0045951 | A1 | 3/2003 | Luk | |
| 2003/0196164 | A1 * | 10/2003 | Gupta et al. | 715/500.1 |
| 2004/0261112 | A1 | 12/2004 | Hicks et al. | |

FOREIGN PATENT DOCUMENTS

| | | |
|---|---|---|
| EP | 1536352 | 1/2005 |
| WO | WO 01/86948 | 11/2001 |
| WO | 2004/004383 | 1/2004 |
| WO | 2004/089397 | 10/2004 |
| WO | 2004/091158 | 10/2004 |

OTHER PUBLICATIONS

Provost, Guy. "How Caching Works." Apr. 1, 2000. HowStuffWorks.com. <http://computer.howstuffworks.com/cache.htm> Apr. 23, 2008.*
Realsystem IQ Production Guide With RealOne Player, Last Update: Apr. 6, 2002 http://web.archive.org/web/20030416130256/http://service.real.com/help/library/guides/realone/ProductionGuide/PDF/ProductionGuide.pdf.*

(Continued)

Primary Examiner—Adam M Queler
(74) Attorney, Agent, or Firm—Ditthavong Mori & Steiner, P.C.

(57) ABSTRACT

A communications system comprising a first terminal device and one or more second terminal devices communicating with the first terminal device. The first terminal device is configured to associate at least one content item with a given multimedia file, and to send the content item associated with the multimedia file from the first terminal device to the one or more second terminal devices; and the second terminal device is configured to present the received content item in the second terminal device when a multimedia file having the same content as the multimedia file with which the at least one content item is associated is presented in the second terminal device.

18 Claims, 4 Drawing Sheets

OTHER PUBLICATIONS

Feb. 25, 2003, "Collaborative Filtering, Recommender Systems, and Recommendation Software: Some Thoughts" XP002284231, http://web.archive.org/web/20030225071308/http://www.thevenue.org/collaborative_filtering.html, pp. 1-3.

2000, Isaacs, S.: "Inside Technique: Tell a Friend" Inside Technique, 2000, XP002230308, www.siteexperts.com/tips/backend/ts7/page1.asp>, © 1997-2000 InsideDHTML.com, LLC.

Aug. 30, 2004, Fürlinger et al., "Interactive annotations in web-based learning systems", Advanced Learning Technologies, Proceedings of the IEEE International Conference on Joensuu, Finland, Aug. 30-Sep. 1, 2004, Aug. 30, 2004, pp. 360-365, XP010741084.

Aug. 2003, Wenyin et al., "Ubiquitous media agents: a framework for managing personally accumulated multimedia files", Multimedia Systems, vol. 9, No. 2, Aug. 2003, pp. 144-156, XP002470817.

* cited by examiner

RECEIVING AND SENDING CONTENT ITEMS ASSOCIATED WITH A MULTIMEDIA FILE

BACKGROUND OF THE INVENTION

1. Field of the Invention

The invention relates to a method of providing content items in a communications system, to a communications system, to a terminal device, to a server device for a communications system, and to a method for commercializing providing of content items in a communications system.

2. Description of the Related Art

The number of different multimedia services in communications systems has increased rapidly over the last few years. For example, digital music purchases over the Internet have increased. Music licenses for digital downloading are available from music industry, and several services have emerged with success. Most of such services are used through a Personal Computer but also mobile Over-The-Air (OTA) download services have been introduced. In OTA multimedia solution, it is not only crucial to provide means to discover and purchase multimedia but also to provide various means for the end users to communicate and share opinions about it. Typically people talk about music, artists, albums and songs; all things related to music, for example. The most enthusiastic fans are even having endless discussions about certain parts of particular music pieces. In addition, people wish to share ratings, reviews and comments regarding to music. There are many possibilities of communicating about music, for example, e-mail, blogging and newsgroups can be used for sharing opinions about music.

However, there is a need for a simple way of communicating opinions about multimedia. For example, in a situation where a user wishes to share his/her opinions about a certain piece of media, for example about a specific part of a favourite song, there is no opportunity of attaching opinions to the piece of media itself in a temporal fashion. For example, if a user wishes to attach something to a piece of media, he/she has to use a professional scale multimedia authoring tool for making even small additions or then try to utilize various metadata solutions for adding comments to the media. Both ways are of course difficult, time consuming, and impossible to use for most users.

SUMMARY OF THE INVENTION

According to an aspect of the invention, there is provided a method of providing content items in a communications system. The method comprises: associating at least one content item with a multimedia file by a first terminal device; sending the content item associated with the multimedia file from the first terminal device to one or more second terminal devices; and presenting the received content item in the second terminal device when a multimedia file having the same content as the multimedia file with which the at least one content item is associated is presented in the second terminal device.

According to an embodiment of the invention, there is provided a communications system comprising a first terminal device and one or more second terminal devices communicating with the first terminal device. The first terminal device is configured to associate at least one content item with a given multimedia file, and to send the content item associated with the multimedia file from the first terminal device to the one or more second terminal devices; and the second terminal device is configured to present the received content item in the second terminal device when a multimedia file having the same content as the multimedia file with which the at least one content item is associated is presented in the second terminal device.

According to an embodiment of the invention, there is provided a terminal device for a communications system, the terminal device comprising a processing unit for controlling functions of the terminal device, a communications unit coupled to the processing unit for communicating, and a memory for storing data. The processing unit is configured to associate at least one content item with a multimedia file, and to send the content item associated with the multimedia file from the terminal device to one or more second terminal devices for enabling presenting the sent content item in the second terminal device when a multimedia file having the same content as the multimedia file with which the at least one content item is associated is presented in the second terminal device.

According to an embodiment of the invention, there is provided a server device for a communications system, the server device comprising a processing unit for controlling functions of the server device, a communications unit for communicating with terminal devices of the communications system, and a memory for storing data. The processing unit of the server device is configured to receive at least one content item associated with a multimedia file from a first terminal device, and to send the received content item to one or more second terminal devices for enabling presentation of the content item in the one or more second terminal devices when a multimedia file having the same content as the multimedia file with which the at least one content item is associated is presented in the second terminal device.

According to an embodiment of the invention, there is provided a terminal device for a communications system, the terminal device comprising a processing unit for controlling functions of the terminal device, a communications unit for communicating, and a memory for storing data. The processing unit is configured to receive at least one content item associated with a multimedia file, and to present the received content item in the terminal device when the multimedia file is presented in the terminal device.

According to an embodiment of the invention, there is provided a communications system comprising: first terminal means for associating at least one content item with a multimedia file, and for sending the content item associated with the multimedia file from the first terminal means to the one or more second terminal means; and second terminal means for presenting the received content item in the second terminal means when a multimedia file having the same content as the multimedia file with which the at least one content item is associated is presented in the second terminal means.

According to an embodiment of the invention, there is provided a method for commercializing providing of content items in a communications system, the method comprising: associating at least one content item with a multimedia file by a content provider; receiving, from a client terminal, a request for purchasing one or more content items associated with the multimedia file; and sending the at least one content item associated with the multimedia file from the content provider to the client terminal for enabling presentation of the content item in the client terminal when a multimedia file having the same content as the multimedia file with which the at least one content item is associated is presented in the client terminal.

The embodiments of the invention provide several advantages. Communicating content items relating to specific multimedia becomes easy. New context to messaging and sharing is achieved. Communication becomes richer.

BRIEF DESCRIPTION OF THE DRAWINGS

In the following, the invention will be described in greater detail with reference to the preferred embodiments and the accompanying drawings, in which.

DETAILED DESCRIPTION OF THE PREFERRED EMBODIMENTS

Figure 1:
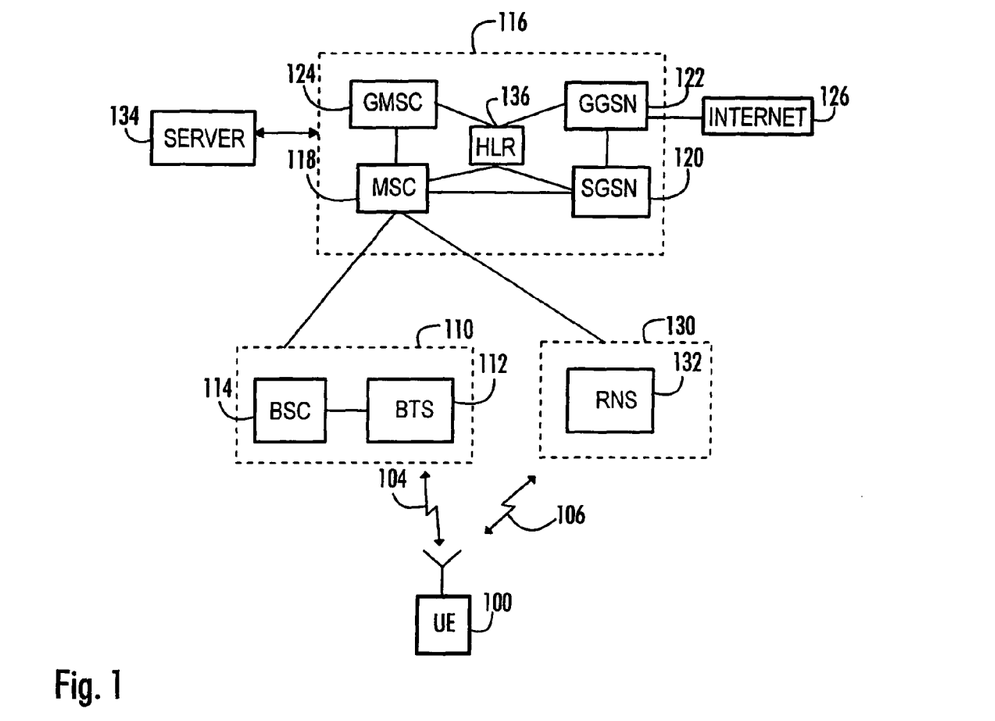
FIG. 1 shows an example of a communications system.

The embodiments of the invention are applicable in communications systems and terminal devices, such as in mobile stations used as a terminal in telecommunications systems comprising one or more base stations and terminals communicating with the base stations. With reference to FIG. 1, examine an example of a structure of a communications system to which the preferred embodiments of the invention can be applied. The structure and functions of the elements of the system are not described in detail because they are generally known. The system in FIG. 1 is arranged to set up connections 104, 106 between different terminal devices 100 in the communications system or between the terminal devices 100 and an external network 126, for example.

The main parts of a communications system are a core network 116, a base station system 110, a radio access network 130 and a terminal device 100. On a general level, the system can also be defined to comprise a terminal device, which is also known as a subscriber terminal or a mobile phone, for instance, and a network part, which comprises the fixed infrastructure of the communications system, i.e. the core network, radio access network and base station system.

The structure of the core network 116 corresponds to a combined structure of the GSM and GPRS systems. GSM network elements are responsible for establishing circuit-switched connections, and GPRS network elements are responsible for establishing packet-switched connections, some of the network elements being, however, used in both systems. A server 134 maintained by a service provider, such as an operator, controls the core network 116. In some applications, the server 134 may communicate with the communications system over a radio interface in the same manner as the terminal device 100.

A mobile services switching centre (MSC) 118 is the centre point of the circuit-switched side of the core network 116. The same mobile services switching centre 118 can be used to serve the connections of both the radio access network 130 and the base station system 110.

Large core networks 116 may have a separate gateway mobile services switching centre (GMSC) 124, which takes care of circuit-switched connections between the core network 116 and external networks. An external network can be for instance a public land mobile network (PLMN) or a public switched telephone network (PSTN).

A home location register (HLR) 136 contains a permanent subscriber register, i.e. the following information, for instance: an international mobile subscriber identity (IMSI), a mobile subscriber ISDN number (MSISDN), an authentication key, and when the radio system supports GPRS, a packet data protocol (PDP) address.

A serving GPRS support node (SGSN) 120 is the centre point of the packet-switched side of the core network 116. The main task of the serving GPRS support node 120 is to transmit and receive packets with the terminal devices 100 supporting packet-switched transmission by using the radio access network 130 or the base station system 110. The serving GPRS support node 120 contains subscriber and location information related to the terminal devices 100.

A gateway GPRS support node (GGSN) 122 is the packet-switched side counterpart of the gateway mobile services switching centre 124 of the circuit-switched side with the exception, however, that the gateway GPRS support node 122 must also be capable of routing traffic from the core network 116 to external networks 126, whereas the gateway mobile services switching centre 124 only routes incoming traffic. In our example, the Internet represents external networks 126.

The base station system 110 comprises a base station controller (BSC) 114 and a base transceiver station (BTS) 112. The base station controller 114 controls the base transceiver station 112.

The radio access network 130 comprises a radio network subsystem 132. The radio network subsystem is either the full part or only the access part of a UMTS terrestrial radio access network (UTRAN), providing allocation and release of specific radio resources to establish means of connection between the terminal device 100 and the UTRAN.

The terminal device 100 is e.g. a mobile phone or any another device including communication means, such as a personal digital assistant (PDA), a computer, handheld computer or an intelligent phone. The terminal device 100 may contain a transceiver for establishing a communications link 104, 106 to the radio access network 130 or base station system 110. The user terminal 100 may also comprise the possibility of employing short-range communication; such as a transmitter-receiver function implemented using for example a Bluetooth chip, or an infrared or a WLAN connection. In addition, the terminal device 100 may contain an antenna, a user interface and a battery. The terminal device 100 may be a user terminal type device, or for example a server computer that can be communicated with over a communications network, for example, over the Internet 126. The user of the terminal device 100 may thus be, for example, a service provider offering specific services in the communications system.

Figure 2:
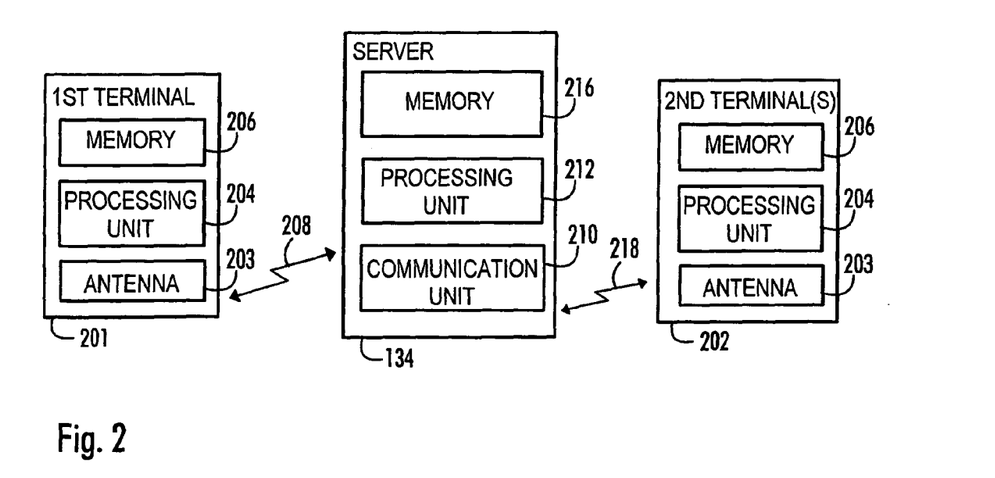
FIG. 2 illustrates an example of a communications system.

FIG. 2 shows a structure of a communications system. In an embodiment, the communications system comprises a first terminal device 201, a server device 134 and a second terminal device 202.

The terminal devices 201, 202 include processing units 204 for controlling the functions of the terminal devices 201, 202, memories 206, and communication units 203 for establishing communications connections 208, 218. The terminal devices 201, 202 may communicate over a radio interface or via cable connections, for example. The terminal devices 201, 202 may comprise conventional components, including wireless modems, processors, a user interface, a display, etc.

The server device 134 includes a processing unit 212 for controlling functions of the server device 134, a memory 216 and a communication unit 210 for communicating with the terminal devices 201, 202.

In an embodiment, the first terminal device 201 is configured to associate at least one content item with a given multimedia file, and to send the content item associated with the multimedia file from the first terminal device to one or more second terminal devices 202. The second terminal device 202 is configured to present the received content item in the second terminal device 202 when a multimedia file having the same content as the multimedia file with which the at least one content item is associated is presented in the second terminal device 202.

In an embodiment, the content items may be attached to personal tag points in the main media and be shared with other users. In an embodiment, it is assumed that the terminal devices 201, 202 include almost the same collection of multimedia files. Hence, the multimedia files themselves need not be sent over the communications system but only the content items associated with the multimedia files. The content items are then accessible by the second terminal devices via corresponding multimedia files.

The content item may be related to the multimedia file, such as to a musical piece, and can be a text, a picture, a video, an audio recording, a logo, a screen saver, a ringing tone, a multimedia presentation, a vibration/flashing/backlight/beeping tone sound of the terminal device, and a link to a video, a game, a screen saver, a ringing tone or a multimedia presentation, and a series of these or any combination thereof. The content item may comprise, for example, an object identification relating to the specific multimedia file, data about the multimedia file, comments, advertisements, or the like.

The terminal devices 201, 202 may be mobile devices having sufficient memory for different media collection. The terminal devices 201, 202 may include media attachment client applications for taking care of managing the associating of the content items with specific files. The media attachment client application may take care of the following tasks: sending, receiving, removing, replying, forwarding, rating and modifying the content items associated with given multimedia files. The media attachment client application may receive the attachments and look up the right main media for the attachments. Then when the actual main multimedia file is played the attachments are available for presentation. In an embodiment, the second terminal device 202 is configured to notify about the arrival of the content items or not, depending on the settings.

The server device 134 controls the content item flow to and from the terminal devices 201, 202. The server device 134, such as an attachment service centre, may take care of receiving and distributing the content items associated with the given multimedia files to recipients, to the second terminal devices 202 for example. The server device 134, for example, buffers the attachments, schedules the sending and sends them to the recipients. The server device 134 may also handle content adaptation for different application platforms in various terminal devices 201, 202. If the recipient does not happen to have a multimedia file having the same content as the multimedia file with which the at least one content item is associated, then the recipient may be informed about the matter and given an opportunity to download the multimedia file, such as a music track, from the server device 134, for example.

Figure 3:
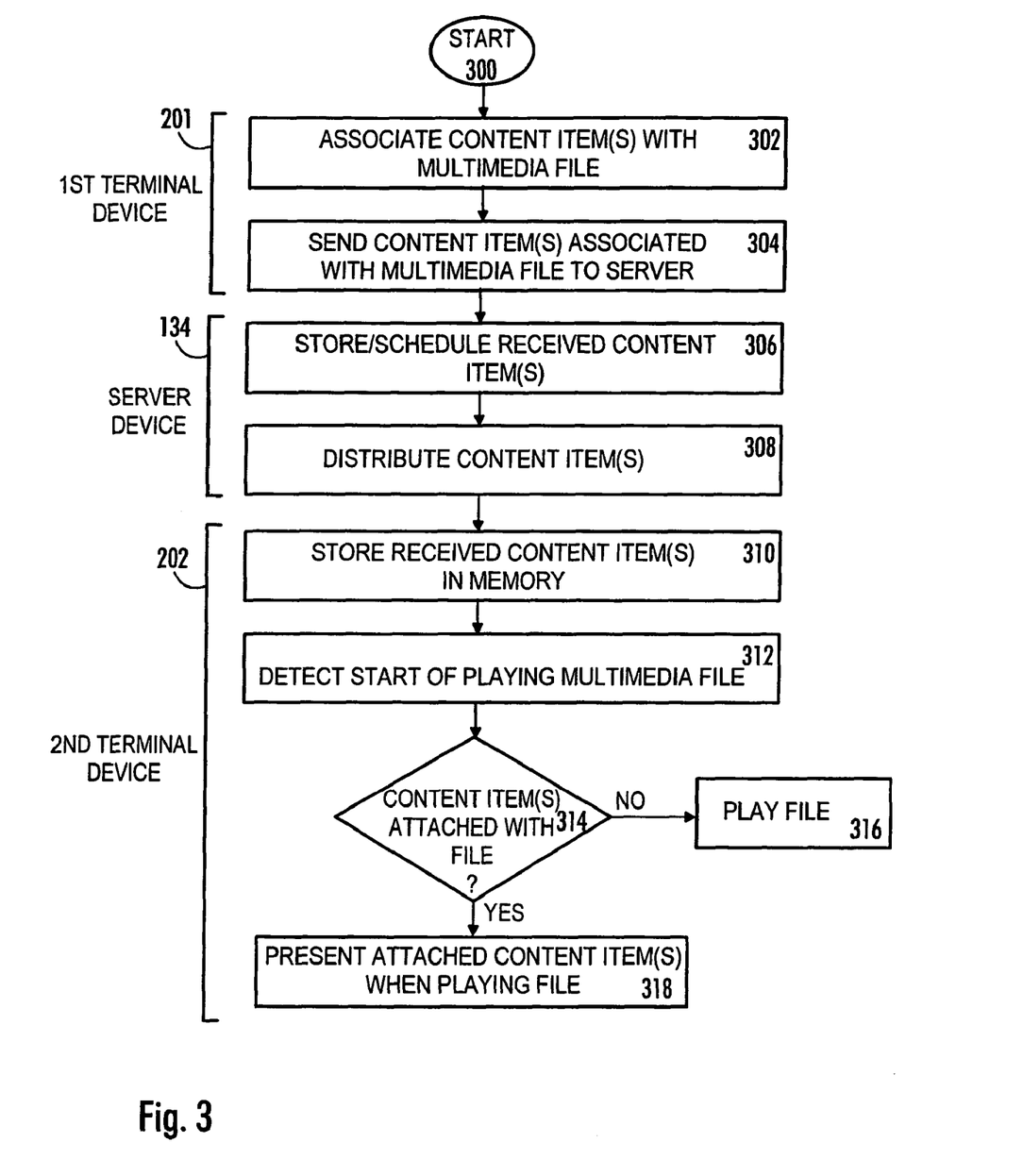
FIG. 3 illustrates an example of a method of providing content items in a communications system.

FIG. 3 illustrates an example of a method of providing content items in a communications system. The vertical lines 201, 134, 202 denote examples of the devices taking care of different steps of the method, and are the first terminal device, the server device and the second terminal device respectively. The method starts in 300.

In 302, at least one content item is associated with a multimedia file by a first terminal device 201. The content item, such as a text, an audio, a video, an image, a multimedia presentation, and a series of these or any combination thereof, may be associated with one or more specific parts of the multimedia file, for example. The content item may be associated with the multimedia file by making a separate (outside) tag/annotation or embedding the content item in the multimedia file itself. In an embodiment, the content item is attached to be part of the multimedia file.

In 304, the content item associated with the multimedia file is sent to one or more second terminal devices from the first terminal device. In an embodiment, only the content item attached with the specific multimedia is sent to the second terminal device. However in another embodiment, the multimedia file to which the at least one content item is attached may be sent to the second terminal device. The content items are sent via a server of a communications system, for example.

In 306, the content item is received in the server device 134. The server device may store the content item and schedule distributing the content item to the second terminal device. In 308, the content items are distributed to the second terminal device by the server device.

In 310, the second terminal device stores the received content item in a memory. The second terminal device may also give an indication about receiving the content item. In an embodiment, the second terminal device may check if a multimedia file having the same content as the multimedia file with which the at least one content item is associated is included in the second terminal device. If it is detected that such a multimedia file is missing from the second terminal device, the second terminal device may notify the user and request a permission for retrieving it. In an embodiment, it is possible that the second terminal device automatically retrieves the missing multimedia file when needed.

In 312, the start of playing a multimedia file is detected. In 314, it is detected whether there are any content items attached to the multimedia file to be played. If content items associated to the multimedia file are detected, 318 is entered. Otherwise the multimedia file is played in 316.

In 318, the attached content item(s) is(are) presented in the second terminal device when playing the multimedia file. In an embodiment, the content item may be presented in the second terminal device at a given moment in time during the presentation of the multimedia file on the basis of the association of the content item with the one or more specific parts of the multimedia file.

Figure 4:
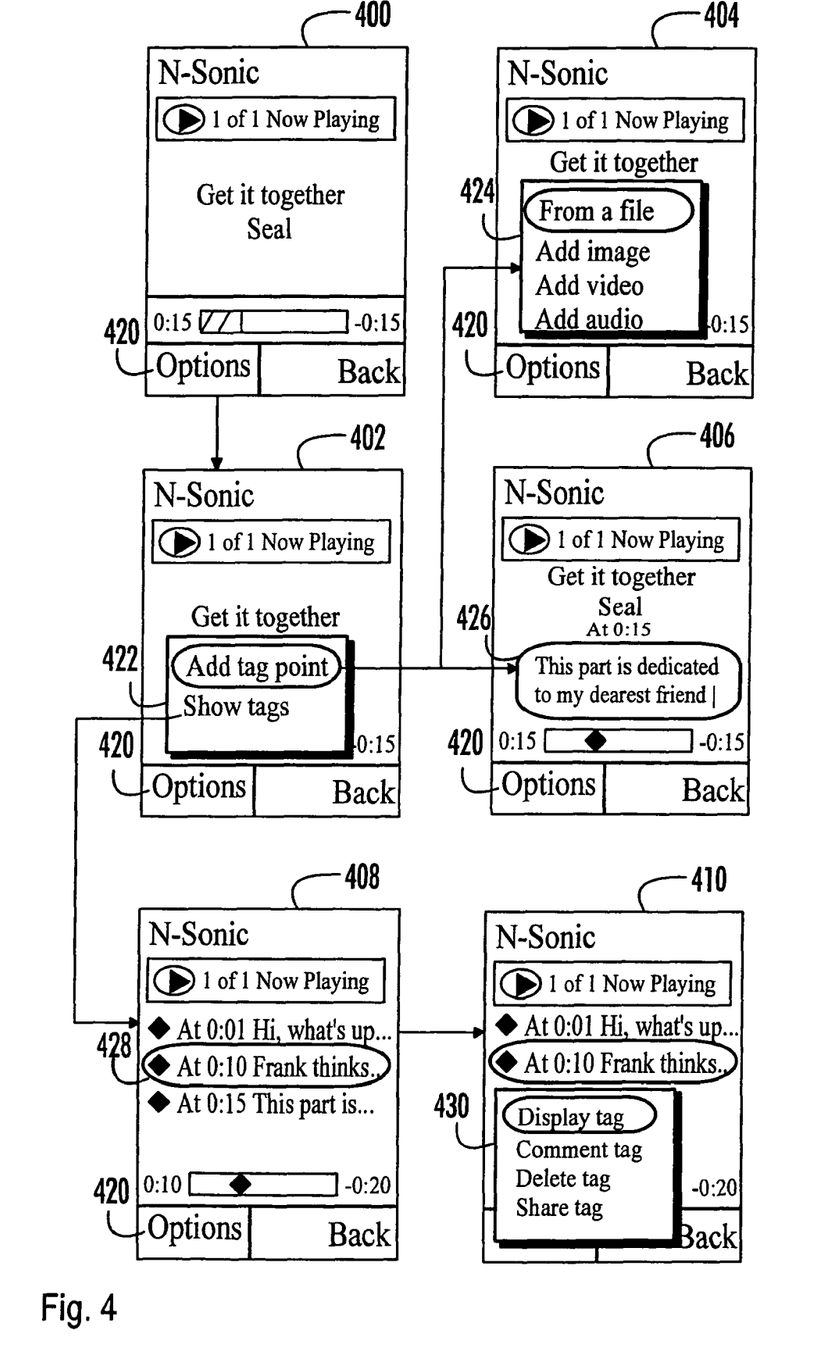
FIG. 4 illustrates examples of displays of a terminal device for a communications system.

FIG. 4 illustrates embodiments of the invention by showing exemplary views to displays of a terminal device. Let us assume a user of the terminal device wishing to create media attachments. The user may be listening to music and wishes to share his/her opinions with a friend, for example. At first the user may mark the part where he/she wants to add an attachment. Then the user may type text or import a file to the attachment. Finally, the user may review and approve the attachment for distribution.

At first, the display of the terminal device may look like a display 400 in FIG. 4. There may be some indications on the display 400 about the currently played music, for example. In the example of FIG. 4, the display 400 comprises menu bars, such as an Options button 420. By choosing the Options button 420, the user may initiate a menu function on the display. An example of a menu 422 is shown on the display 402. The user may choose to add new content items to the currently played music file from the menu 422, for example.

The displays 404 and 406 illustrate different options on how the content items may be attached to the music file. A new menu 424 may be opened showing the user different content items that can be attached to the music. The user may choose to use content items from a file, to add an image, a video or an audio, for example. In an embodiment, a text window 426 may be opened on the display 406, and the user may write his/her comments there.

After associating the desired content items with specific parts of the music, the user may also wish to view all the attached content items. The user may then choose an option of showing all the tags from the menu 422 on display 402, for example. A list 428 of all the attached content items may appear on the display 408. Choosing an item from the list 428 may initiate a selection menu 430 (display 410). The user can review, modify or delete the attachment by using the selection menu 430, for example.

The user may then initiate sending of the attachments from another menu, for example, when the user has finished adding attachments to the music. Then the terminal device contacts an Attachment Service Centre (ASC), for example, and sends the new attachments. Also other parameters may be delivered with the attachments, such as recipients' ID:s and "on/off" notification. The ASC may store the attachment and the delivery parameters in a memory, and schedule the delivery of the attachment. Finally, ASC carries out sending of the attachment to the recipients one by one. The recipient terminal device application receives the attachment and, depending on the delivery parameters, this may be notified. A list of attachments is updated in the recipient terminal device.

Finally some use cases of the embodiments are presented. Two friends, Laura and Lisa, both listen to the music of their favourite artist Ricky Martin every day with their multimedia devices. Laura and Lisa like to leave their messages in the Ricky Martin music. What Laura adds to her Ricky Martin songs is always automatically sent to Lisa and vice versa. The messages may be like: "This is my favourite part of this song. I was sitting in a bus when writing this. See you tonight at the party." Laura and Lisa use Ricky Martin's music as their playground to share their daily drama of life with each other.

Two guitarists, Frank and Hank, like to use their multimedia devices for highlighting specific guitar solos of legendary rock songs. What usually happens is that Frank notifies Hank what guitar solo is under study and both purchase the same track via the Internet, for example. As a more knowledgeable guitarist, Frank makes notes about the guitar solo and shares his hints and tips with Hank who adores Frank's talent. One day Hank is going to be as fast as Frank with the help of this communications system.

James is a member of Ville Valo community, which is a large group of people all around the world listening to the music of Him and worshipping Ville Valo. James listens to Him daily and wishes to receive all the new messages the music includes. Messages are, for example, comments, ratings and reviews, fan pictures and short video clips. James thinks that this type of service makes music of Ville Valo more enjoyable. There is always some new stuff attached to the familiar songs.

Figure 5:
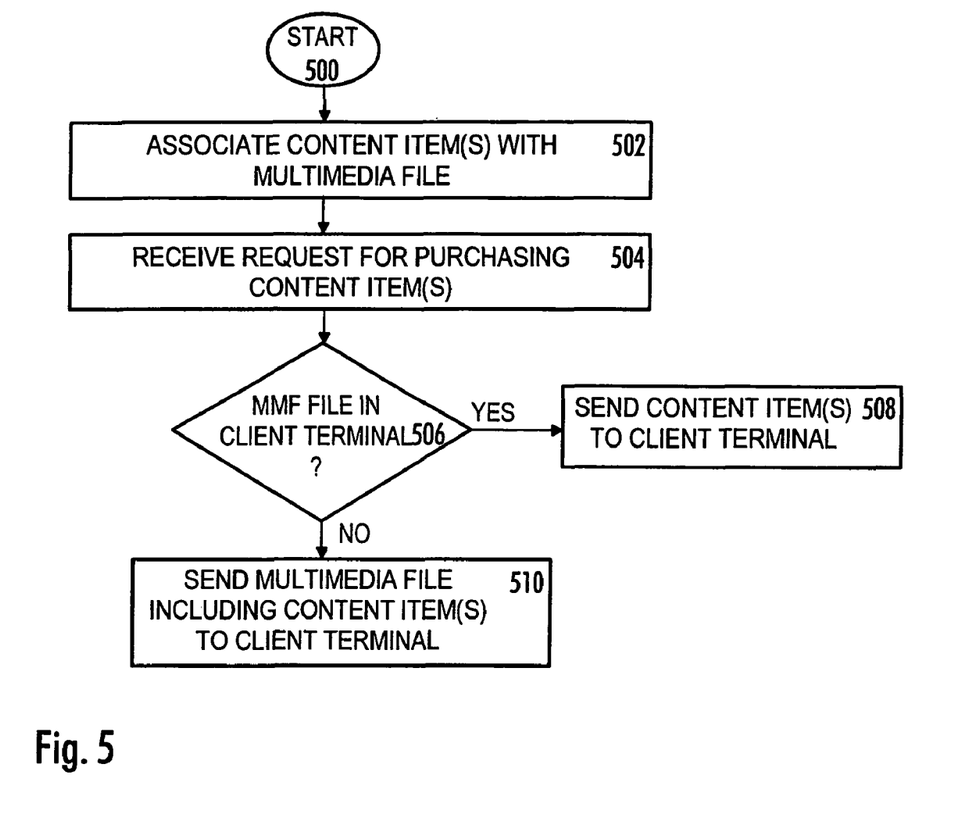
FIG. 5 illustrates a method of commercializing providing of content items in a communications system.

Thus, it is possible to commercialize an embodiment of the invention as a service, for example. FIG. 5 illustrates a method of commercializing providing of content items in a communications system. The method starts in 500. A content provider provides services related to multimedia files. In 502, first a given content item, such as a review, is associated with a multimedia file, with a piece of music for example, by the content provider. The content provider may then advertise the content items and services it has to offer by different means, for example in news papers, on the Internet and so on. The content items associated with given multimedia files may be sent to a server. The multimedia file including the content item may also be sent to the server. The member of a given community may have selected to receive content items associated with given multimedia files regularly. Thus, content items associated with songs of Ville Valo, for example, are sent to some clients, and other content items associated with a particular piece of music are sent to other clients. The clients may purchase specific content items or multimedia files including the content items they wish to receive via the server, for example. In 504, a request for purchasing one or more content items associated with the multimedia file is received from a client terminal. In 506, it can be detected whether the client terminal includes a multimedia file similar to the one the content items are associated with. In 508, the content item(s) is(are) send to the client terminal for enabling presentation of the content item in the client terminal when a multimedia file having the same content as the multimedia file with o which the at least one content item is associated is presented in the client terminal. If it is detected that the client terminal does not include the given multimedia file, then 510 may be entered, where the multimedia file including the content item(s) associated with it is sent to the client terminal. The clients may be invoiced according to the amount of service, in form of received content items/multimedia files, they have used.

Even though the invention is described above with reference to an example according to the accompanying drawings, it is clear that the invention is not restricted thereto but it can be modified in several ways within the scope of the appended claims.

The invention claimed is:

1. A method comprising:
    causing, at least in part, actions that result in reception of a message embedded with at least one content item associated with a multimedia file by at least one of a title of the file and an artist of the file, the multimedia file not being part of the content item, from a server or a first user mobile terminal device by at least one second user mobile terminal device;
    detecting the absence of such multimedia file with which the at least one received content item is associated in the second user mobile terminal device;
    causing, at least in part, actions that result in retrieval, by the second user mobile terminal device, of a multimedia file having the same content as the multimedia file with which the at least one received content item is associated once the absence of such multimedia file has been detected in the second user mobile terminal device; and
    causing, at least in part, actions that result in presentation of the received content item at the second user mobile terminal device when a multimedia file having the same content as the multimedia file with which the at least one received content item is associated is presented in the second user mobile terminal device.

2. A method of claim 1, the method farther comprising associating the at least one content item with one or more specific parts of the multimedia file; and presenting the received one or more content items in the second user terminal device when the one or more specific parts of the multimedia file are presented.

3. A method of claim 1, wherein the content item includes one or more of the following: a text, an audio, a video, an image, and a multimedia presentation.

4. A method of claim 1, further comprising:
    causing, at least in part, actions that result in transmission, from the second user mobile terminal device, of a request for purchasing one or more content items associated with the multimedia file;
    and
    causing, at least in part, actions that result in purchase of, in response to a multimedia file having the same content as the multimedia file with which the at least one content item is associated not being detected in the second user mobile terminal device, a multimedia file having the same content as the multimedia file from a content provider.

5. A method of claim 1, further comprising: causing at least in part, using the first user terminal device to produce the content item that includes one or more comments and options with respect to the multimedia file.

6. A method of claim 1, further comprising: detecting a start of playing of the multimedia file at the second user mobile terminal device, thereby presenting the received content item at the second user mobile terminal device while the multimedia file is being presented thereat.

7. An apparatus comprising:
at least one processor; and
at least one memory including computer program code,
the at least one memory and the computer program code configured to, with the at least one processor, cause the apparatus to perform at least the following,
cause, at least in part, actions that result in reception of a message embedded with at least one content item associated with a multimedia file by at least one of a title of the file and an artist of the file, the multimedia file not being part of the content item, from a server or a first user mobile terminal device;
detect the absence of such multimedia file with which the at least one received content item is associated in the second user mobile terminal device;
cause, at least in part, actions that result in retrieval of a multimedia file having the same content as the multimedia file with which the at least one received content item is associated once the absence of such multimedia file has been detected in the second user mobile terminal device; and
cause, at least in part, actions that result in presentation of the received content item when a multimedia file having the same content as the multimedia file with which the at least one received content item is associated is presented in the second user mobile terminal device.

8. An apparatus of claim 7, wherein the apparatus is further caused to:
associate the at least one content item with one or more specific parts of the multimedia file; and presenting the received one or more content items in the second user terminal device when the one or more specific parts of the multimedia file are presented.

9. An apparatus of claim 7, wherein the content item includes one or more of the following: a text, an audio, a video, an image, and a multimedia presentation.

10. An apparatus of claim 7, wherein the apparatus is further caused to:
cause, at least in part, actions that result in transmission, from the second user mobile terminal device, of a request for purchasing one or more content items associated with the multimedia file; and
cause, at least in part, actions that result in purchase of, in response to a multimedia file having the same content as the multimedia file with which the at least one content item is associated not being detected in the second user mobile terminal device, a multimedia file having the same content as the multimedia file from a content provider.

11. An apparatus of claim 7, wherein the apparatus is further caused to:
cause at least in part, using the first user terminal device to produce the content item that includes one or more comments and options with respect to the multimedia file.

12. An apparatus of claim 7, wherein the apparatus is further caused to:
detect a start of playing of the multimedia file at the second user mobile terminal device, thereby presenting the received content item at the second user mobile terminal device while the multimedia file is being presented thereat.

13. A computer-readable storage medium carrying one or more sequences of one or more instructions which, when executed by one or more processors, cause an apparatus to at least perform the following steps:
causing, at least in part, actions that result in reception of a message embedded with at least one content item associated with a multimedia file by at least one of a title of the file and an artist of the file, the multimedia file not being part of the content item, from a server or a first user mobile terminal device;
detecting the absence of such multimedia file with which the at least one received content item is associated in the second user mobile terminal device;
causing, at least in part, actions that result in retrieval of a multimedia file having the same content as the multimedia file with which the at least one received content item is associated once the absence of such multimedia file has been detected in the second user mobile terminal device; and
causing, at least in part, actions that result in presentation of the received content item when a multimedia file having the same content as the multimedia file with which the at least one received content item is associated is presented in the second user mobile terminal device.

14. A computer-readable storage medium of claim 13, wherein the apparatus is caused to further perform:
associating the at least one content item with one or more specific parts of the multimedia file; and presenting the received one or more content items in the second user terminal device when the one or more specific parts of the multimedia file are presented.

15. A computer-readable storage medium of claim 13, wherein the content item includes one or more of the following: a text, an audio, a video, an image, and a multimedia presentation.

16. A computer-readable storage medium of claim 13, wherein the apparatus is caused to further perform:
causing, at least in part, actions that result in transmission, from the second user mobile terminal device, of a request for purchasing one or more content items associated with the multimedia file; and
causing, at least in part, actions that result in purchase of, in response to a multimedia file having the same content as the multimedia file with which the at least one content item is associated not being detected in the second user mobile terminal device, a multimedia file having the same content as the multimedia file from a content provider.

17. A computer-readable storage medium of claim 13, wherein the apparatus is caused to further perform:
causing at least in part, using the first user terminal device to produce the content item that includes one or more comments and options with respect to the multimedia file.

18. A computer-readable storage medium of claim 13, wherein the apparatus is caused to further perform:
detecting a staff of playing of the multimedia file at the second user mobile terminal device, thereby presenting the received content item at the second user mobile terminal device while the multimedia file is being presented thereat.

* * * * *